United States Patent Office 2,801,668
Patented Aug. 6, 1957

2,801,668

VEHICLE ANTI-SKID DEVICE

Alexandre Mosca, Prilly-Lausanne, Switzerland

Application November 18, 1953, Serial No. 392,795

Claims priority, application Switzerland June 24, 1953

2 Claims. (Cl. 152—236)

The present invention relates to a removable anti-skid device, particularly for motor vehicles, comprising a part intended for covering, at least partly, the tread of a tire in order to increase the traction of the vehicle. The device is characterized by the fact that it comprises at least two elements distributed over the periphery of the tire and each presenting, in addition to the part covering the tread, at least two attaching means, each of which comprises a part fastened to the device and a part fastened to the wheel. One of the said attaching means is adapted to be positioned adjacent the inside wall, and the other adjacent the outside wall of the wheel. The latter attaching means is provided with a locking toggle intended for exerting a tension directed around the periphery of the tire and for ensuring the securing of the element.

The attached drawing shows, by way of example, a prepared embodiment of the invention.

Figure 1:
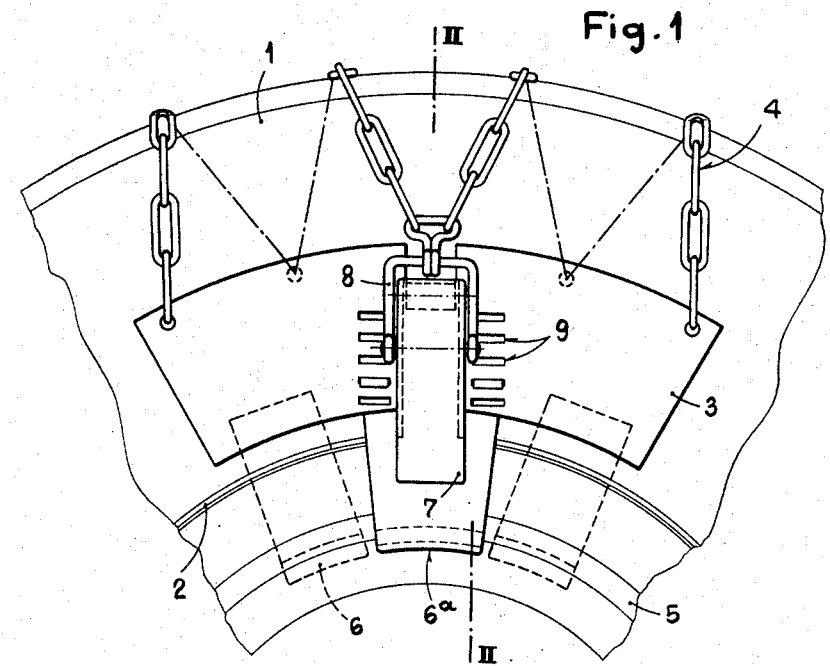
Fig. 1 is a front view of an element of the device mounted on the wheel of a motor vehicle.
Figure 2:
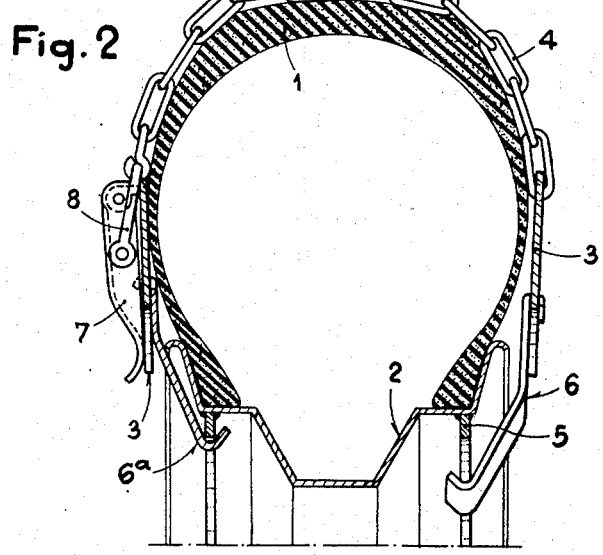
Fig. 2 is a cross-section taken along II—II of Fig. 1.

The device, such as represented by the drawing, preferably comprises six elements placed side by side over the periphery of a tire 1, mounted on a wheel 2. Each of the said elements comprises two metallic segments 3, each presenting a series of spaced holes arranged a short distance from and on a line parallel to the curved edge of said segments. These holes enable the linking together of two segments of an element by a chain 4 arranged between them. This chain is intended to extend about the tread of the tire; it may be arranged in the form of parallel cross parts or in zig-zag, for instance. The mounting of the elements on the wheel of the vehicle may be performed quickly and without lifting the axle. The attaching of the said elements is achieved on each of the two wheel sides by hooking up the corresponding segments to an inwardly extending peripheral rib 5, with which the wheel is provided for this purpose.

In the embodiment represented on the drawing, the rib 5, consisting of a sheet metal ring, has been welded to the two lateral edges of the rim. Alternatively, the rib 5 may be made integral with the wheel rim 2.

Certain rims may present, when made, a structure capable of enabling the attachment of the elements in accordance with the invention.

The attachment of the elements is achieved by means of metallic hooks 6, 6a, the bottom of which rests against the external edge of rib 5 when the element is under tension, this tension exerting itself against the natural resilience offered by the tire 1. Locking of the elements is achieved by means of a known locking toggle device. The one shown on the drawing comprises a lever 7 articulated between the two branches of a fork 8, which is itself articulated to the segment 3 adapted to be placed on the outside of the wheel.

In order that the device in accordance with the invention may be adapted to tires of different sections, each of the elements is provided with means enabling the change of length of the element in relation to the periphery of the section of the tire. The element shown presents a very simple means, which consists in providing in the segments 3 a series of openings 9 at the median portion thereof, in one of which is engaged the end of the hook 6a opposite to that which engages rib 5. The said end presents a slight edge which is engaged in a selected aperture 9 of the segment 3 when the lever 7 is in the released position. The movement of lever 7 from the released position in a direction to place the free end of the lever radially inwardly of the segment 3, tensions the elements.

I claim:

1. A removable anti-skid device for use with an automotive vehicle wheel having a wheel body, inwardly extending peripheral ribs integral with said wheel at opposite sides thereof, and a tire, comprising a plurality of elements distributed about the periphery of the tire, each element including two rigid segments arranged one on each side of the tire and provided with a plurality of spaced apertures near the outer curved edge thereof, chains connecting said segments and extending across the tread of the tire, portions of said chains having their ends engaged in said apertures of the segments, a pair of hooks connecting end portions of one of said segments to one of the ribs of the wheel body, a single hook connecting the median portion of the other of said segments to the other rib of the wheel body, and toggle means connected between the median portion of said other of said segments and portions of the chains for tensioning the chains about the periphery of the tire and for locking the same in tensioned position.

2. An anti-skid device as set forth in claim 1, wherein the median portion of one of the segments is provided with a series of slots to be engaged selectively by its associate hook, whereby the device may be applied to tires of different sections by changing the effective length of the element in relation to the periphery of the section of the tire.

References Cited in the file of this patent

UNITED STATES PATENTS

| | | |
|---|---|---|
| 2,174,345 | Worthing | Sept. 26, 1939 |
| 2,286,011 | Ridgway | June 9, 1942 |
| 2,504,032 | Massey | Apr. 11, 1950 |
| 2,664,133 | Eger | Dec. 29, 1953 |
| 2,710,038 | Holzmueller | June 7, 1955 |